(12) United States Patent
Heines et al.

(10) Patent No.: US 11,758,889 B2
(45) Date of Patent: Sep. 19, 2023

(54) SHAPE MEMORY METAL ARTIFICIAL BAIT

(71) Applicants: Gary Heines, Mound, MN (US); Brett Herdendorf, Mound, MN (US)

(72) Inventors: Gary Heines, Mound, MN (US); Brett Herdendorf, Mound, MN (US)

( * ) Notice: Subject to any disclaimer, the term of this patent is extended or adjusted under 35 U.S.C. 154(b) by 638 days.

(21) Appl. No.: 16/441,739

(22) Filed: Jun. 14, 2019

(65) Prior Publication Data

US 2019/0380321 A1 Dec. 19, 2019

Related U.S. Application Data

(60) Provisional application No. 62/685,477, filed on Jun. 15, 2018.

(51) Int. Cl.

| | | |
|---|---|---|
| *A01K 85/01* | (2006.01) | |
| *A01K 85/16* | (2006.01) | |
| *A01K 83/06* | (2006.01) | |
| *A01K 85/12* | (2006.01) | |
| *A01K 85/08* | (2006.01) | |

(52) U.S. Cl.
CPC .............. *A01K 85/01* (2013.01); *A01K 85/16* (2013.01); *A01K 83/06* (2013.01); *A01K 85/08* (2013.01); *A01K 85/12* (2013.01)

(58) Field of Classification Search
CPC ........................................................ A01K 85/01
USPC ................................................ 43/42.24, 26.2
See application file for complete search history.

(56) References Cited

U.S. PATENT DOCUMENTS

| | | | | |
|---|---|---|---|---|
| 1,906,791 | A * | 5/1933 | Grossmann | A01K 85/16 43/26.2 |
| 5,105,573 | A * | 4/1992 | Mays | A01K 85/16 43/17.1 |
| 5,203,103 | A * | 4/1993 | Hawley | A01K 85/00 43/17.1 |
| 5,694,714 | A * | 12/1997 | Basso | A01K 85/16 43/26.2 |
| 5,924,236 | A * | 7/1999 | Preston | A01K 85/16 43/42.31 |
| 5,970,647 | A * | 10/1999 | Watkins | A01K 85/08 43/42.31 |
| 6,058,644 | A * | 5/2000 | Irwin | A01K 85/16 43/26.2 |
| H1865 | H * | 10/2000 | Aoki | 43/42.13 |
| 6,393,758 | B1 * | 5/2002 | Sparkman | A01K 85/08 43/42.25 |
| 6,925,747 | B1 * | 8/2005 | Swanson | A01K 85/16 43/17.1 |
| 8,621,776 | B2 * | 1/2014 | Thomas | A01K 85/01 43/42.31 |
| 8,950,105 | B2 * | 2/2015 | Thomas | A01K 85/01 43/26.2 |
| 2004/0025406 | A1 * | 2/2004 | Kato | A01K 85/16 43/42.24 |

(Continued)

*Primary Examiner* — Christopher P Ellis
(74) *Attorney, Agent, or Firm* — Vidas, Arrett & Steinkraus PA; Richard A. Arrett; Edwin E. Voigt, II (57) ABSTRACT

An artificial bait having a housing in the shape of an insect or animal, a power source arranged in the housing, a controller arranged in the housing, a hook. The housing including shape memory alloy (SMA) in the form of one or more SMA wires, which are operatively arranged with one or more spring wires to cause one or more body parts of the housing to move.

1 Claim, 7 Drawing Sheets

(56) References Cited

U.S. PATENT DOCUMENTS

| | | | | |
|---|---|---|---|---|
| 2004/0123510 | A1* | 7/2004 | Essad | A01K 85/00 43/42.13 |
| 2006/0000137 | A1* | 1/2006 | Valdivia y Alvarado | A01K 85/01 43/42.2 |
| 2007/0193106 | A1* | 8/2007 | Gregory | A01K 85/00 43/42.36 |
| 2008/0202016 | A1* | 8/2008 | Robertson | A01K 85/08 43/42.27 |
| 2008/0289243 | A1* | 11/2008 | Huddleston | A01K 85/00 43/41 |
| 2010/0236130 | A1* | 9/2010 | Basso | A01K 85/01 43/42.31 |
| 2011/0252689 | A1* | 10/2011 | Abraham | A01K 85/01 43/26.2 |
| 2012/0180372 | A1* | 7/2012 | Kennedy | A01K 85/00 43/4.5 |
| 2014/0000149 | A1* | 1/2014 | Signitzer | A01K 85/01 43/42.02 |
| 2015/0250153 | A1* | 9/2015 | Storm | A01K 85/12 43/42.19 |
| 2019/0343102 | A1* | 11/2019 | Choi | A01K 85/16 |

* cited by examiner

SHAPE MEMORY METAL ARTIFICIAL BAIT

CROSS-REFERENCE TO RELATED APPLICATIONS

This application claims priority to provisional patent application No. 62/685,477, which was filed Jun. 15, 2018, and the entire contents of which is hereby incorporated by reference.

STATEMENT REGARDING FEDERALLY SPONSORED RESEARCH

Not Applicable

FIELD OF THE INVENTION

The present invention relates to an animated artificial bait which uses shape memory metal to make the bait move.

DESCRIPTION OF THE PRIOR ART

There are many lures and jigs that adequately emulate a bait fish or bug under the water. But surface or floating lures have and issue in that only way to get a motion to them is to pull or jig the line. This not only leaves an unnatural ripple across the surface of the water from line, but also make the lure make rapid movement forward. This motion does not at all emulate a bug struggling in the water.

Currently lures are either motionless or are a minnow that have a wiggling tail. There are no lures on the market that emulate the motions of a bug struggling on the surface of the water. There are also none that emulate the motions of a worm, frog, snake or other thing not a minnow or bait fish.

SUMMARY OF THE INVENTION

The general purpose of the present invention, which will be described subsequently in greater detail, is for an artificial bait having a housing in the shape of an insect or animal, a power source arranged in the housing, a controller arranged in the housing, a hook. The housing including shape memory alloy (SMA) in the form of one or more SMA wires, which are operatively arranged with one or more spring wires to cause one or more body parts of the housing to move. The artificial bait housing shape can be a dragonfly, bee, worm, frog, a bait fish, or a fire fly, or any other desired animal or insect.

The artificial bait can wherein the housing is in the shape of a dragonfly and at least one of the SMA wires causes a tail section of the housing to move. The housing can include wing shapes which are operatively connected to one or more SMA wires to cause the wing shapes to move to emulate a dragonfly struggling on the surface of the water. The housing can include wing shapes which are operatively connected to one or more electric motors which cause the wing shapes to move to emulate a dragonfly struggling on the surface of the water.

The artificial bait wherein the housing is in the shape of a bee having a pair of paddles in the shape of bee wings which are magnetically coupled to an electric motor, so that the bee shaped housing will disturb the water to emulate the buzz of a bee on the surface of the water. The controller can have an oscillator which will cause the paddles to move at a predetermined frequency to emulate the buzz of a bee, for a predetermined period of time and then a second predetermined time of no movement of the paddles before cycling again. The frequency can either to emulate an insect or could be tuned a frequency that the target fish is attracted to.

The artificial bait wherein the housing is in the shape of a worm with the spring wire extending the length of the housing body, and with the SMA wires being attached to portions of the spring wire, to cause the housing to twitch or move to emulate the movement of a worm on the surface of the water or submerged under the water.

The artificial bait wherein the housing is in the shape of a frog with a pair of body portions which emulate the legs of a frog and with the one or more spring wires being arranged in the leg portions of the body with the one or more SMA wires being attached to the spring wires in the leg portions, to emulate the movement of a frog on the surface of the water.

The artificial bait wherein the housing includes wing shapes which are operatively connected to a movement device selected from the group consisting of SMA, electric motor and voice coil, which cause the wing shapes to move to emulate an insect or animal struggling on the surface of the water.

The artificial bait can be of the type having a housing in the shape of an insect or animal, the improvement being arranging shape memory alloy, spring wire, a power source and a controller in the housing to emulate an insect or animal struggling on the surface of the water. The artificial bait can include one or more electric motors to cause portions of the housing to move. The housing portions which are caused to move can be wings, a tail section, an elongate body section, leg sections. The power source can be one or more super capacitors. The housing can include wing shapes which are operatively connected to a movement device selected from the group consisting of SMA, electric motor and voice coil, which cause the wing shapes to move to emulate an insect or animal struggling on the surface of the water. The housing can further include rotating bent wires which are operatively connected to a movement device selected from the group consisting of SMA, electric motor and voice coil, which cause the rotating bent wires to move to splash the water to emulate an insect or animal struggling on the surface of the water. The artificial bat can also include a vibration device to cause one or more portions of the housing to vibrate.

These together with other objects of the invention, along with the various features of novelty which characterize the invention, are pointed out with particularity in the claims annexed to and forming a part of this disclosure. For a better understanding of the invention, its operating advantages and the specific objects attained by is uses, reference should be made to the accompanying drawings and descriptive matter in which there are illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawing wherein.

DETAILED DESCRIPTION OF THE INVENTION

With reference now to the drawing, and in particular to FIGS. 1 through 13 thereof, an artificial bait using shape memory alloy (SMA), motors, and voice coil/solenoids to create movement in the bait, embodying the principles and concepts of the present invention will be described.

This invention uses Shape Memory Alloys (SMA), motors, and voice coils/solenoids to create realistic motions in the bait. There are three main types of motion that this invention seek to emulate. A bug of some type struggling on the surface of the water; a worm, frog or other non-bait fish type creature, or a smooth realistic motion of a bait fish. These are only examples of the motion and types of bait and are not intended to limit the scope of the invention.

By way of further explanation, current running through the SMA wire causes it to heat up, which triggers the SMA to change shape to its warm state shape. The invention will use a PWM circuit to control total power put in to the SMA wire. The control will be able to monitor the voltage of the power source and adjust the PWM duty cycle to keep a linear response as the power source decays. This will allow the bait to get longer life from the power source. When current is not running through the SMA wire, it will cool and revert to its cool state shape.

The drive to move the bait uses shape memory alloys (SMA). Shape Memory Alloys (SMA) wires are a very compact way to drive these motions. They can be imbedded in to rubber which makes them ideal for fishing lures. Small efficient motors could also be used to emulate repetitive motion of beating wings. Magnetic coupling of a motor, solenoid or voice coil can be used to couple the motion device to the moving component such as a wing through a sealed rubber body.

The power source can be mercury free batteries or preferably a super capacitor. The super capacitor has the advantage of being capable of a very large number of charge cycles without degrading. It is also advantages to have 2 super capacitors. A smaller one that could maintain a voltage to run the control circuit and a larger one could be used to drive the motion device. Since the motion device can be drive at low voltage than the control circuit this scheme would increase the usable time after a charging. Super capacitors also have the advantage of that they can be completely seal in since they never need to be changed. They also charge very quickly so they do not need to be charged a head of time. This quick charge ability also mean they don't need to last as long since charging them is less of an inconvenience. Their quick charging and shorter run time also mean they run without a switch. The user would simple charge it and let it run until it dies when they are finished using it. This not only help reduce the cost and size of the lure but also help reliability issues of having a switch on a sealed unit.

The control can be as simple as a transistor flasher circuit to a micro controller. Micro controllers can be used to run motors at varying RMPs with a Pulse Width Modulation (PWM) drive. RMPs can be varied to emulate different bug's wing beats or tail motions. Micro controllers can also use PWM to drive SMA wires. They can also monitor the voltage of the power source and increase the PWM duty cycle as voltage level drops to help extend the usable time between changings.

Figure 1:
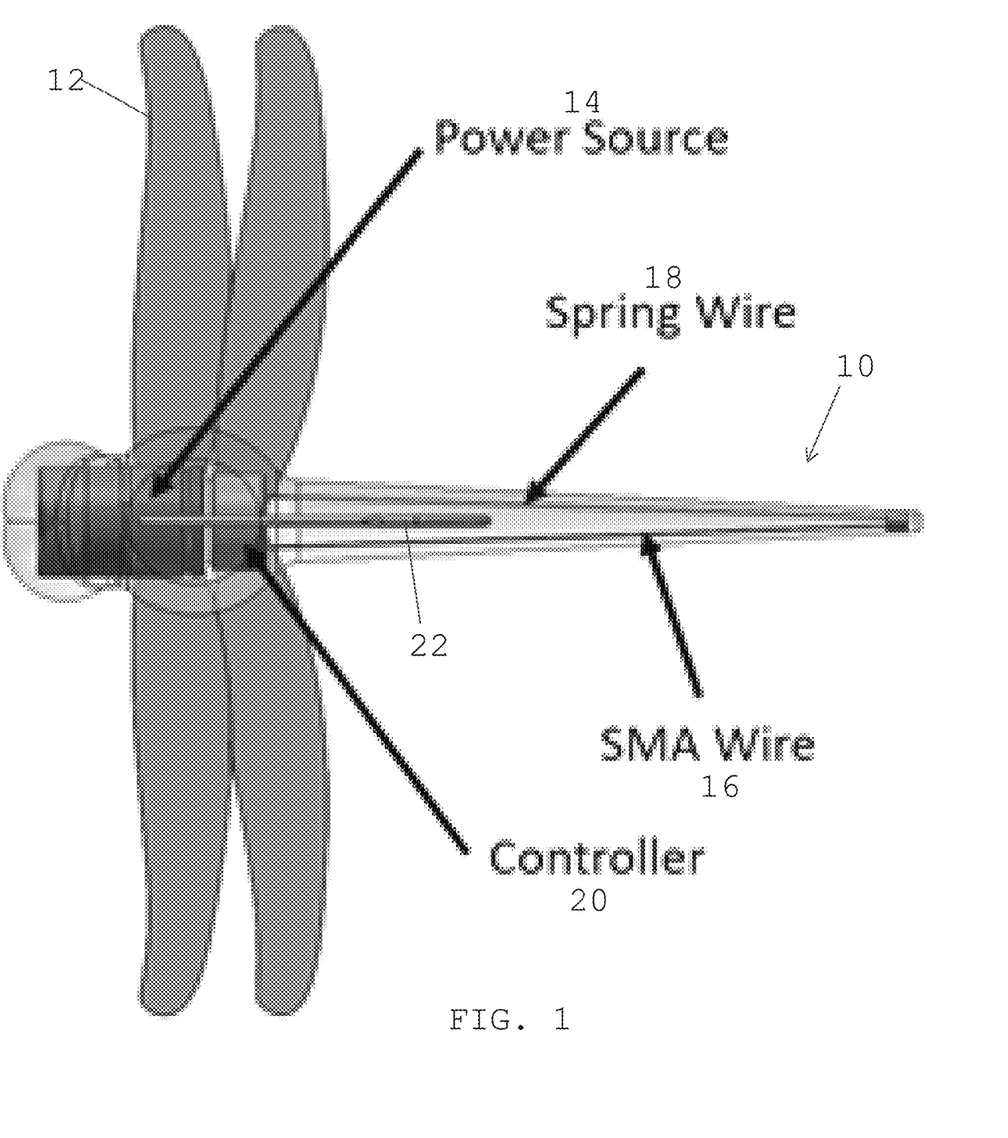
FIG. 1 is a top view of a dragonfly embodiment of the invention.
Figure 2:
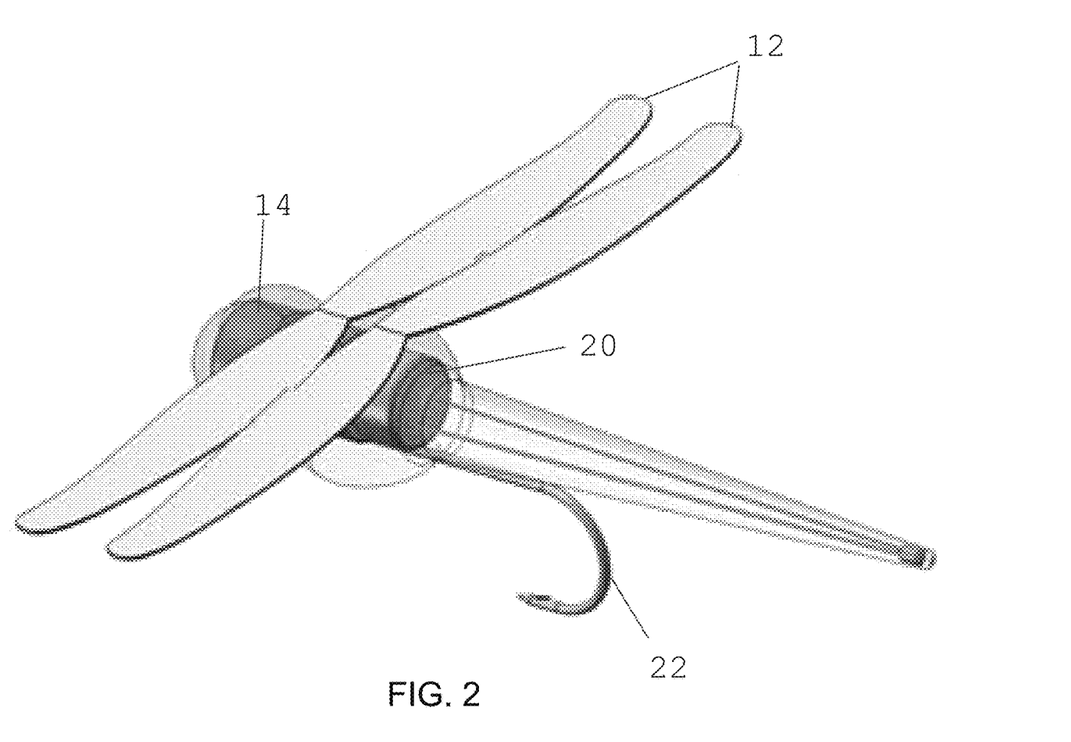
FIG. 2 is a perspective view of FIG. 1.
Figure 3:
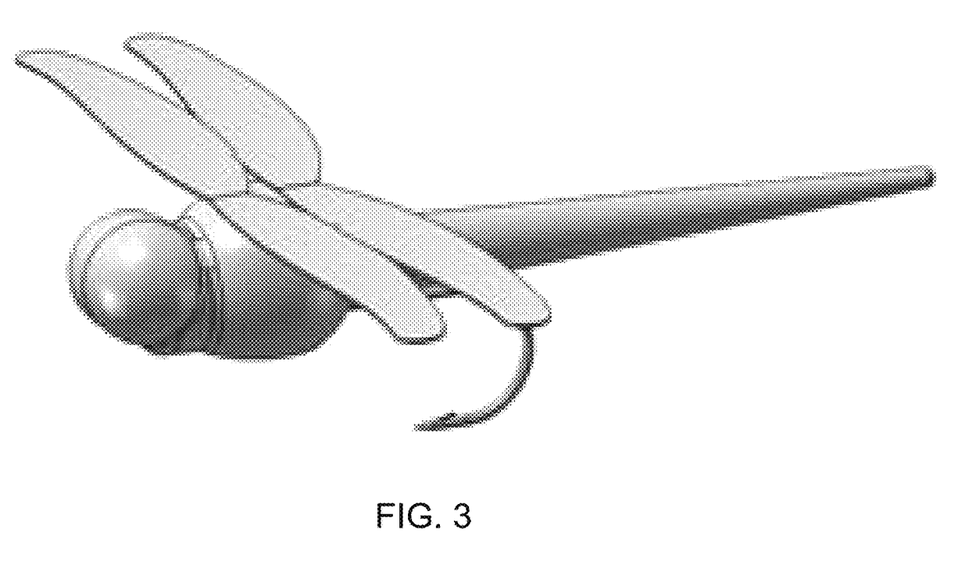
FIG. 3 is a side view of FIG. 1.
Figure 4:
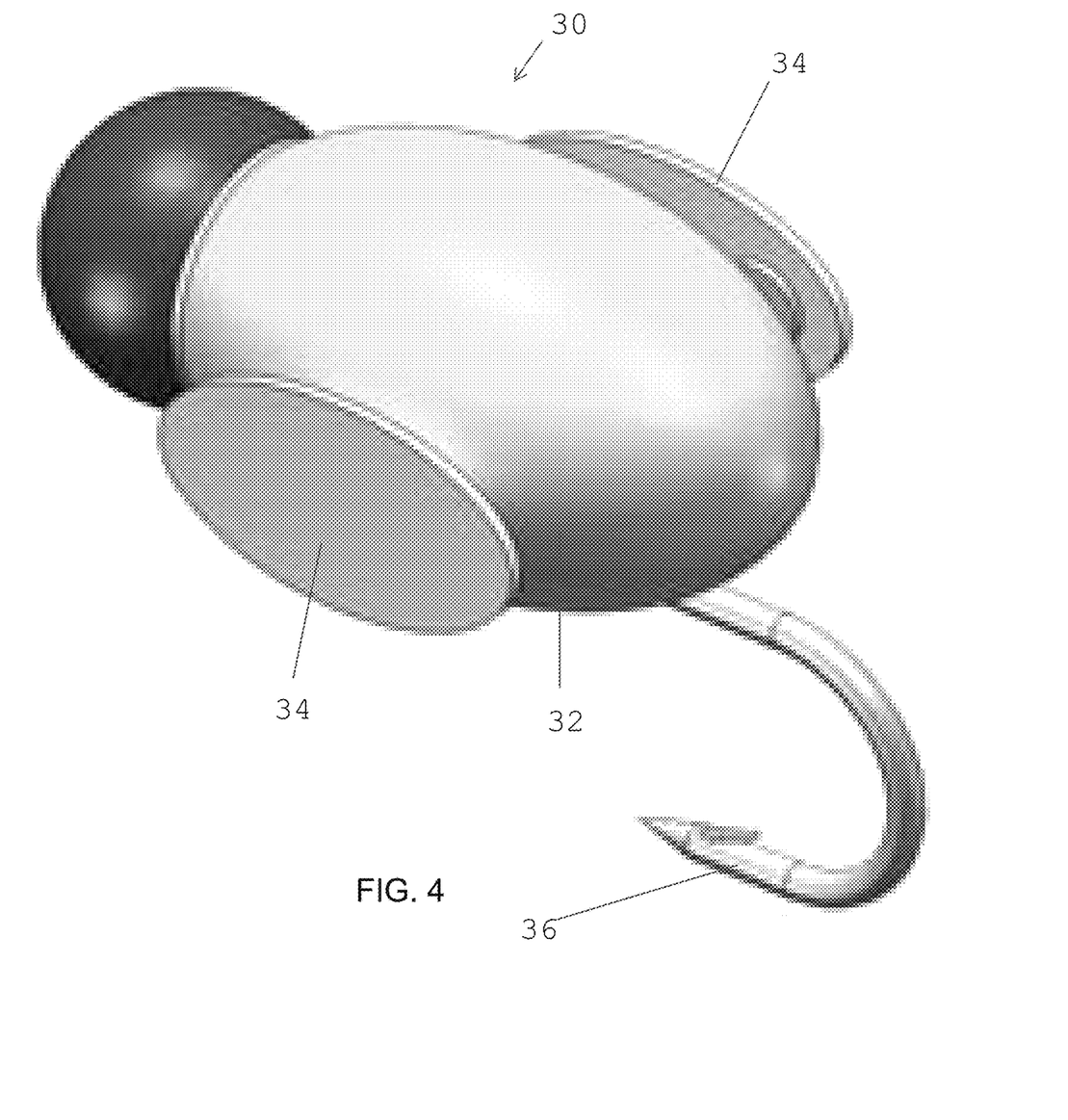
FIG. 4 is a perspective view of a bee embodiment of the invention.
Figure 5:
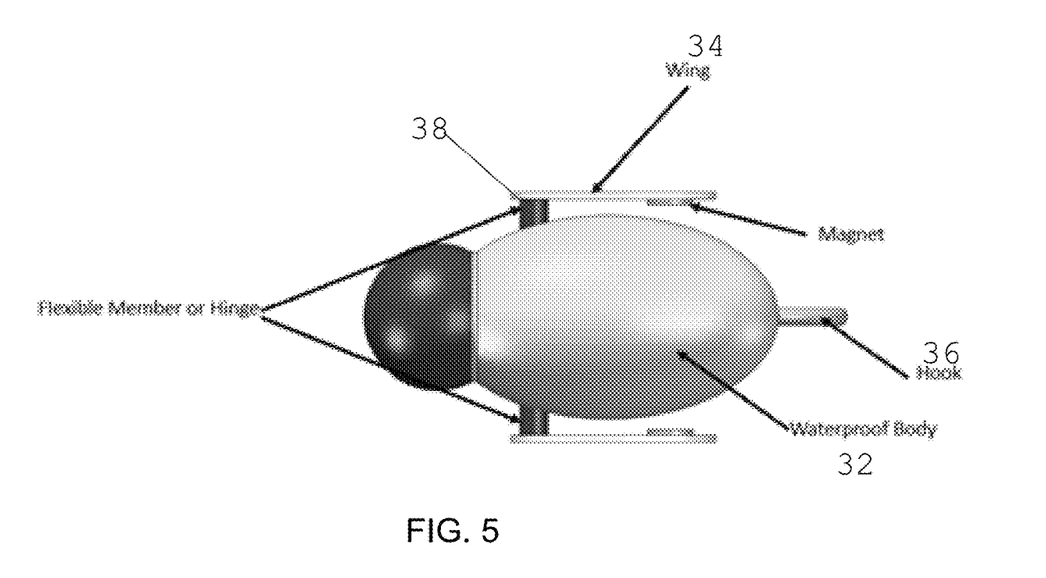
FIG. 5 is a top view of FIG. 4.
Figure 6:
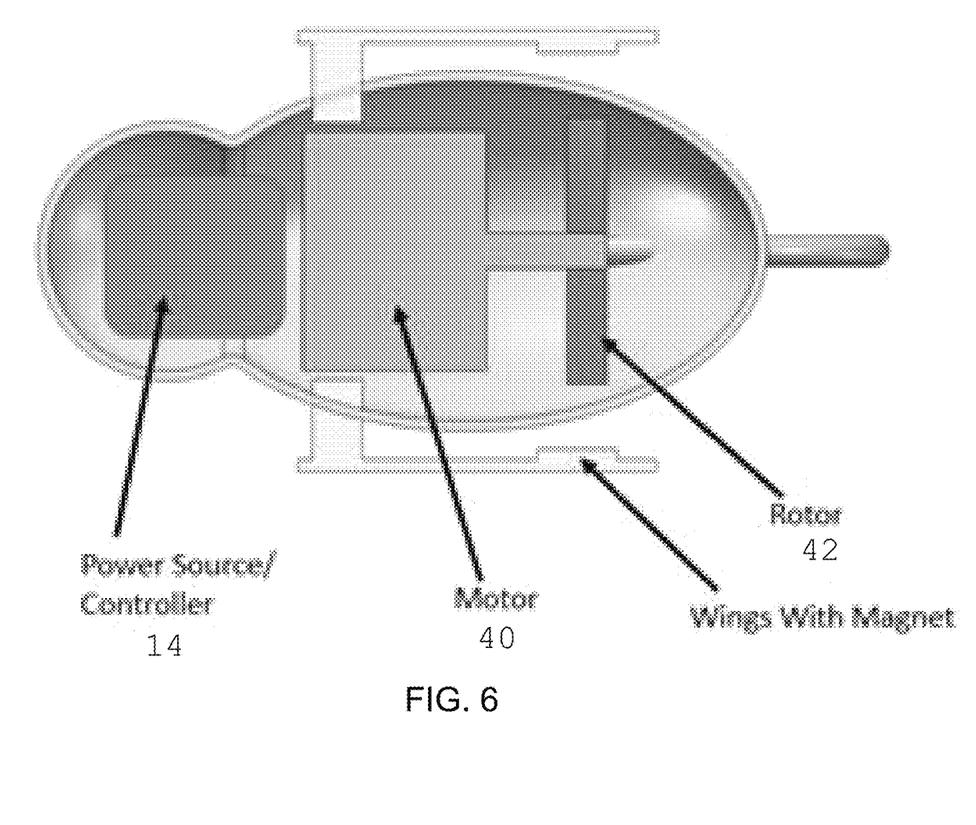
FIG. 6 is a cross-section view of FIG. 5.
Figure 7:
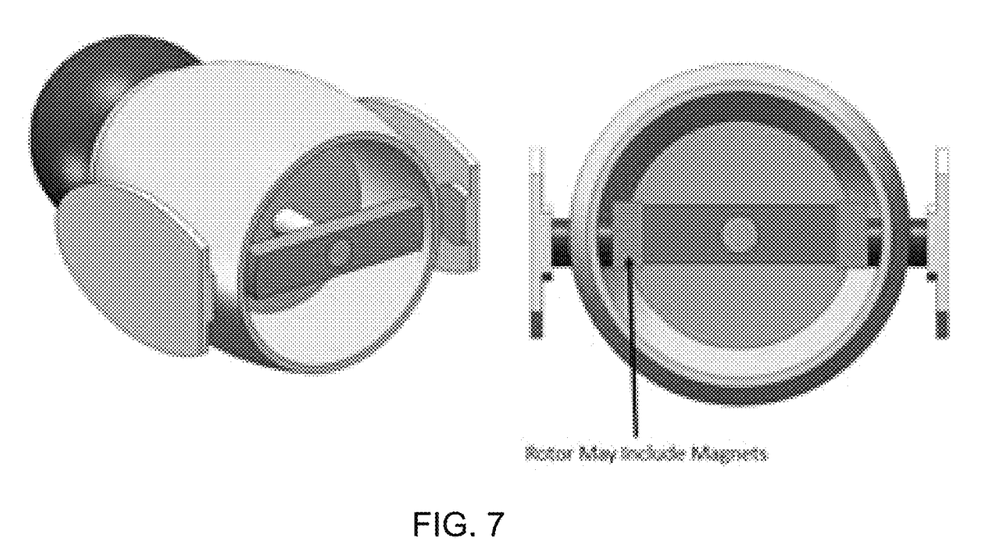
FIG. 7 shows different rear views of FIG. 4.

Referring now to FIGS. 1-3, a dragonfly embodiment of the invention is shown generally at 10. Four wings 12 are connected to the housing, which hold the power source 14, the controller 20 and the tail section, which contain a SMA wire 16 connected to a spring wire 18. A hook is provided at 22. The dragon fly can use an SMA wire 16 connected to a spring wire 18, both embedded in the rubber tail section to create slow tail motions. This embodiment could either have a magnetically coupled motor or SMA wire to pulse the wings. The wings could also be controlled to do short bursts of higher energy, higher frequency, wing motions to attract fish from a longer distance away. Then this embodiment could be controlled to make slower, low energy tail motions to continue attracting fish as they get closer in while using less energy to extend the life of the power device Referring now to FIGS. 4-7, a bee embodiment of the invention is shown generally at 30. The bee housing 32 will have 1 or 2 paddles that are magnetically coupled to a small motor on the inside of the housing, and a hook 36. The paddles 34 will disturb the water to mimic the buzz of the wing in the water. The bee will most likely have a small oscillator circuit to control it. The oscillator will cause the paddles to buzz for the short interval of time then dwell for a set time before doing it again. FIG. 5 better shows the magnets attached to the paddles 34 which are used to make the paddles spin on hinge 38. FIG. 6 shows the inside of housing 32, with the power source 14, motor 40 and rotor 42. FIG. 7 shows that the rotor can be ferromagnetic or have magnets mounted at each end, to cause the paddles to rotate.

The voice coil and motor spin magnets of FIG. 7, with opposite facing polarity would cause the wings (or other parts) to move by magnetically coupling to magnets or magnetic metals embedded in the wings (or legs or body parts). The advantage of embedding magnets is that they will attract to one magnet polarity then repel when the voice coil current direction is reversed, or opposite rotating magnet is come around. This will double the range of motion.

There are many other insects or animals which could be moved with shape memory metal to make an artificial bait. This disclosure is not limited to only the above examples.

The drive system can make the artificial wings of the insect move by being driven by a voice coil, a motor or the shape memory metal. The internal magnets can be coupled to a single blade of a spinning propeller in one or even two areas of the body. A bent wire can also be spun by a motor to hit the water and create an attractive noise or water disruption. A motor with an offset weight on a drive shaft could be used to vibrate the legs or body. A paddle could be vibrated using a voice coil to disturb the water.

Therefore, the foregoing is considered as illustrative only of the principles of the apparatus of a shape memory artificial bait. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An artificial bait comprising:
    a housing in the shape of an insect or animal;
    a power source arranged in the housing;
    an electric motor comprising a rotor arranged in said housing;
    a controller arranged in the housing;
    a hook, and
    wherein the housing is in the shape of a bee having a pair of paddles in the shape of bee wings; said wings having magnets attached at their distal ends configured to interact with said rotor, so that the bee shaped housing will disturb the water to emulate the buzz of a bee on the surface of the water; said controller comprises an oscillator configured to intermittently move said paddles at a predetermined frequency between periods of vibration and no vibration.

\* \* \* \* \*